(No Model.)
H. M. POPE.
VELOCIPEDE.
No. 354,840. Patented Dec. 21, 1886.
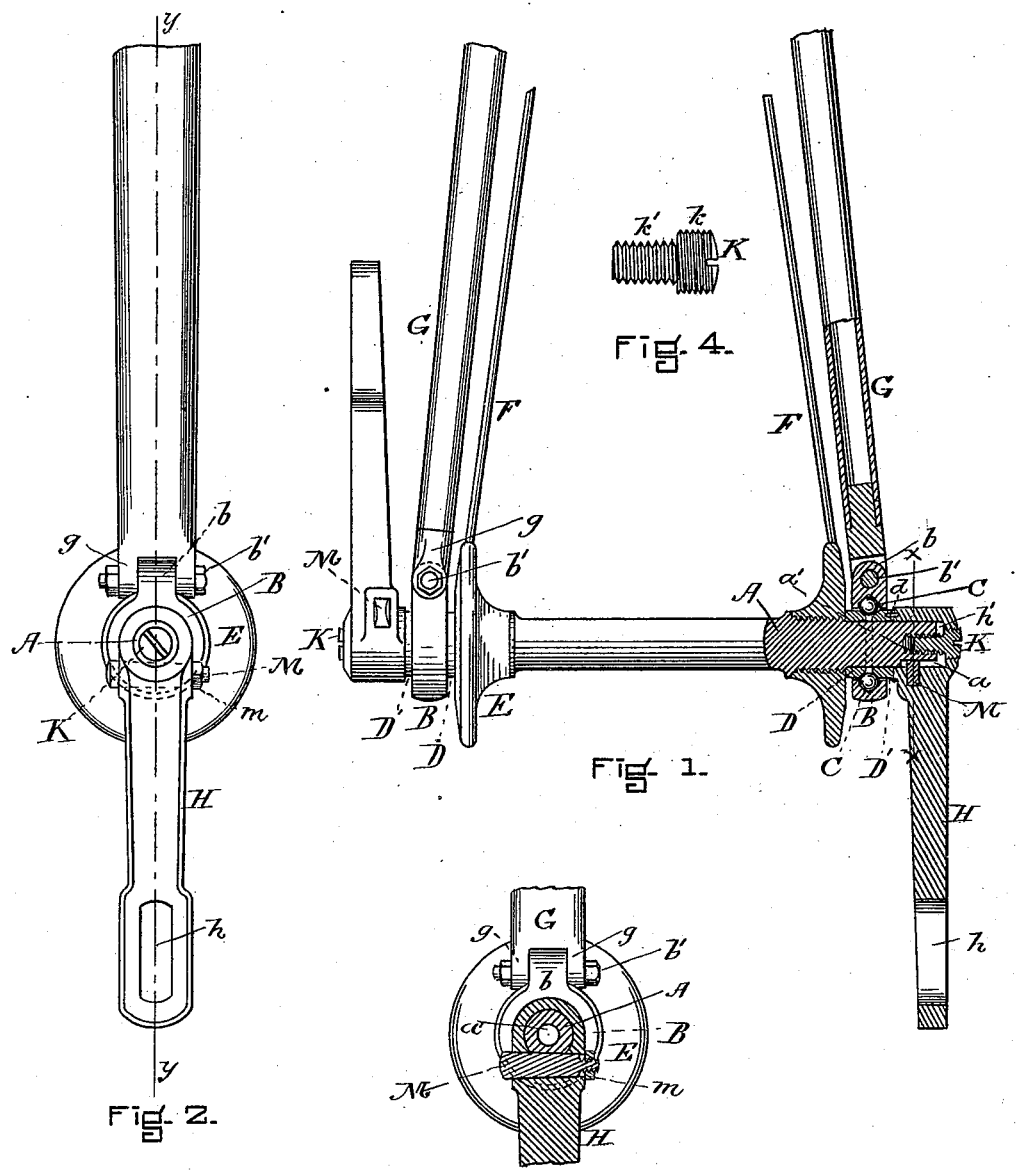
WITNESSES.
Joseph Ishbaugh.
Stedman Buttrick
INVENTOR.
Harry M. Pope
By Charles E. Pratt
atty

UNITED STATES PATENT OFFICE.

HARRY M. POPE, OF HARTFORD, CONNECTICUT, ASSIGNOR TO THE POPE MANUFACTURING COMPANY, OF SAME PLACE.

VELOCIPEDE.

SPECIFICATION forming part of Letters Patent No. 354,840, dated December 21, 1886.

Application filed December 5, 1885. Serial No. 184,779. (No model.)

*To all whom it may concern:*

Be it known that I, HARRY M. POPE, of the city and county of Hartford, in the State of Connecticut, have invented certain new and useful Improvements in Velocipedes, of which the following is a specification.

The nature of my improvements will be apparent from the following specification, taken in connection with the accompanying drawings, in which—

Figure 1 shows, in part in elevation and in part in section on the dotted line Y Y of Fig. 2, the shaft-cranks, bearing-boxes, and part of the wheel and front fork, and other parts of a bicycle embodying my improvements in one form; and Fig. 2 shows in end elevation the right-hand parts of Fig. 1; and Fig. 3 shows parts of the same in elevation and parts in section on the dotted line x x of Fig. 1, and Fig. 4 shows in enlarged detail the differential screw hereinafter more fully described.

A is a shaft having a plain cylindrical portion at the thread end with a flattened part or chamfer at $a$, and a recess threaded for the screw in either end, this recess being concentric with the axle or shaft.

B is a bearing-box containing a circular row of balls, C C.

D D' are two parts of a sleeve having a bearing-surface for balls.

E E are flanges, and F F the spokes of the wheel, and G G are branches of the fork or parts of the frame of the bicycle in which the shaft and wheel are held, $g\,g$ being lugs in which the lug $b$ on the bearing-box B is held by means of a bolt, $b'$.

$a$ is a chamfer for the key M to rest upon and prevent the crank H from turning on the axle, and $a'$ is a threaded hole or slot to receive one part of the screw K.

H is a crank having a slot, $h$, for a pedal-pin and recess $h'$ for the shaft end and the transverse slot for the key M. The crank H is also constructed with a blind or full parts over the shaft end, with a threaded hole or perforation therein for the screw K.

A pin may be inserted part in the sleeve D' and part in the crank-boss, as shown in Fig. 1, and a similar pin may be inserted part in the sleeve D and part in the flange E, the object of these pins being to prevent the parts of the sleeve from turning on the shaft.

K is a screw, constructed with one larger part, $k$, and a smaller part, $k'$, both of these parts being threaded, but threaded with a different pitch, so that when the screw is turned in the perforation in the crank parts and the recess $a$ around in the shaft end it shall travel slightly faster in the shaft end than it does in the crank parts, and thus gradually draw the crank and the part of the sleeve D' toward the part of the sleeve D and the flange E, so as to make a delicate adjustment of the bearing and hold the parts in place longitudinally with respect to the shafts.

M is a slightly tapered key fitting a slot in the crank parts and pressing with one of its tapered sides on the chamfer $a$ in the shaft end, and is so constructed and applied that after the crank and sleeve D' and the balls and other parts of the bearing have been properly adjusted, or after the machine has been used in adjustment for wear, the key M may be driven snugly to a seat on the chamfer $a$, and in the crank parts, and held there by means of the nut $m$, so as to prevent the crank from revolving on the shaft and complete the securement of all parts in proper position.

To remove the crank or to adjust the bearing, the key M is started first and then the screw K. To secure the crank and the bearing, the screw K is fixed first in position and then key M.

It is obvious that by this combination, construction, and arrangement of parts I am enabled to obtain a delicate and careful adjustment of the bearing in a very small space and secure the attachment of the crank to the shaft, a very narrow "tread" of the bicycle and a simple and economical method of manufacture.

It is obvious that formal modifications may be made in the form and arrangement of the parts without departing from the substantial form of my invention, and I do not mean to limit myself to the precise form and arrangement shown and described.

I am aware of Letters Patent No. 322,733, to E. G. Latta, and that there is shown in that patent a nut or cap with differential screwthreads for holding the crank upon the axle, and for aiding in putting the crank on and off, and I do not claim anything shown or described in that patent; but my contrivance is an improvement over and presents differences from that of Latta.

I am also aware of United States Letters Patent Nos. 275,917 and 321,508, in which screws or nuts are used in combination with crank and axle, and I do not claim anything shown or described therein; but neither of them shows my differential screw K, or anything to perform its functions or the combination which I have invented.

I claim as new and of my invention—

A differential screw, K, with a larger part, as $k$, having a thread of slower pitch, and a smaller part, as $k'$, having a thread of quicker pitch, a shaft, A, with chamfered side $a$ and threaded recess $a'$, a two-part cone-sleeve, D D', a circular row of balls, C C, and a bearing-box, B, a crank, H, having a recess, $h'$, for the end of the shaft, and a transverse slot for a key, and a blind side at the end of the recess for the shaft end, and a threaded perforation in the blind side concentric with the threaded recess in the shaft, and a key, M, and nut $m$, all constructed and combined to operate essentially as shown and described.

HARRY M. POPE.

Witnesses:
 WM. B. NELSON,
 E. A. DE BLOIS.